(Model.) 3 Sheets—Sheet 1.
H. H. BARKER & G. EDMONSTON.
Cut Out for Telephone Alarms.
No. 232,665. Patented Sept. 28, 1880.
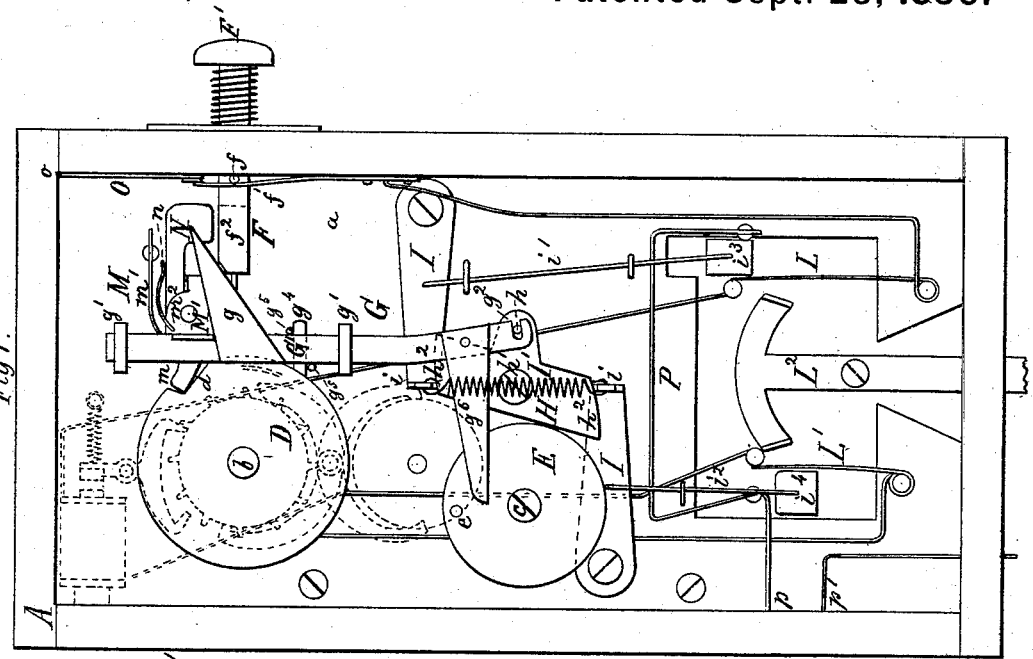
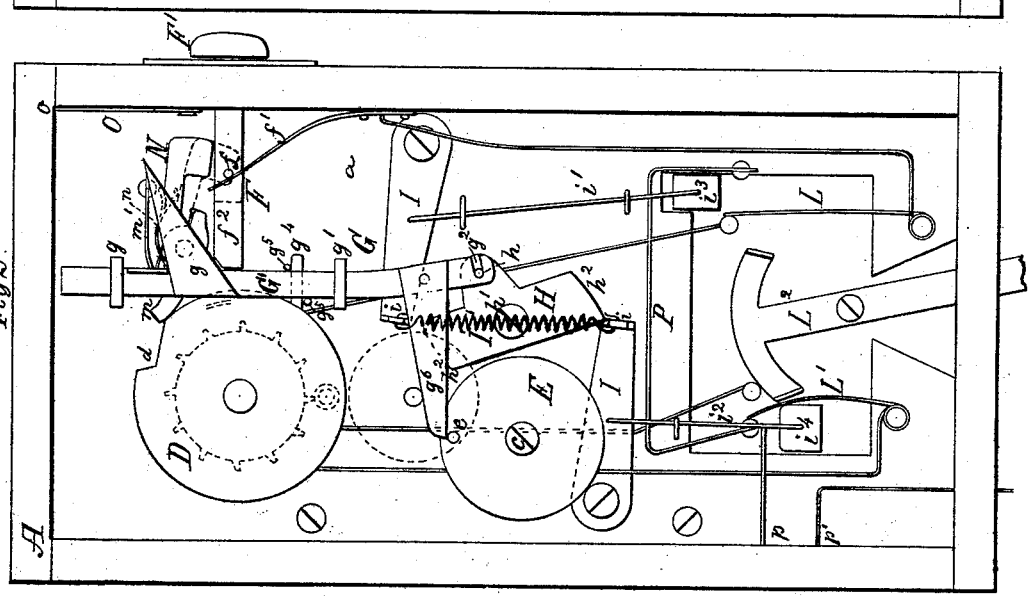
Witnesses:
Inventors:
Howard H. Barker
Gabriel Edmonston
by
Mason Fenwick & Lawrence
Attorneys (Model.)
3 Sheets—Sheet 2.
H. H. BARKER & G. EDMONSTON.
Cut Out for Telephone Alarms.
No. 232,665. Patented Sept. 28, 1880.
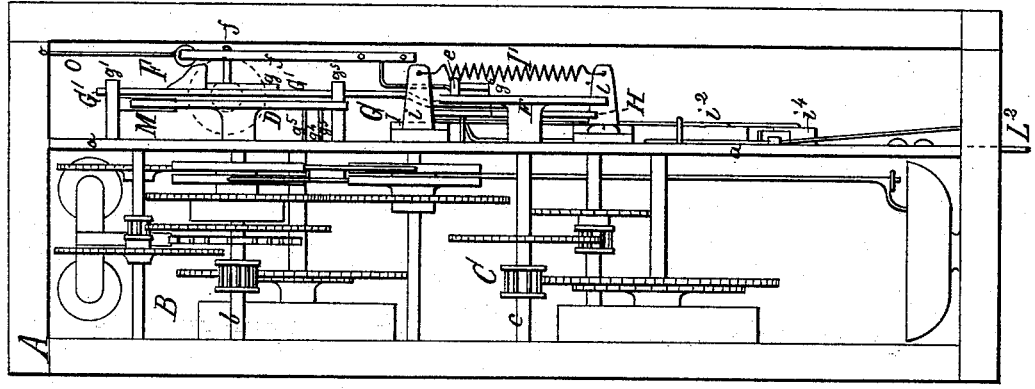
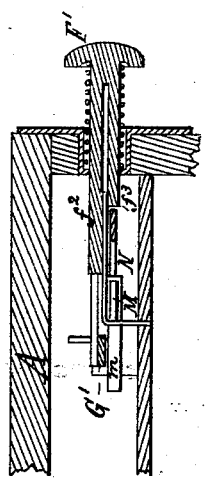
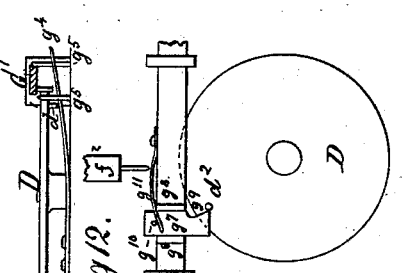
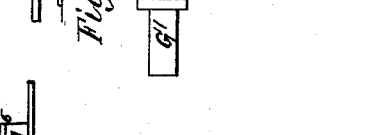
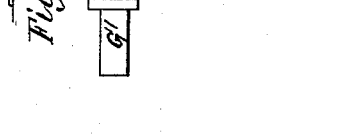
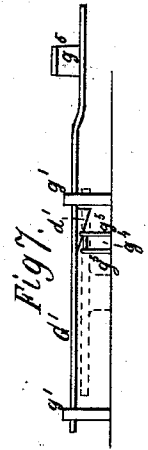
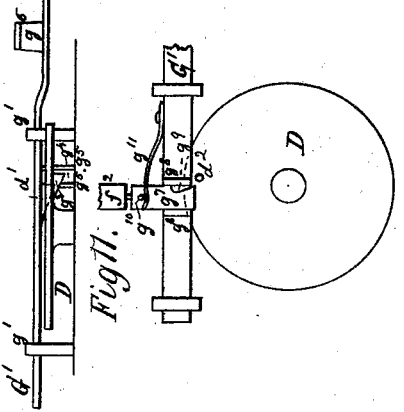
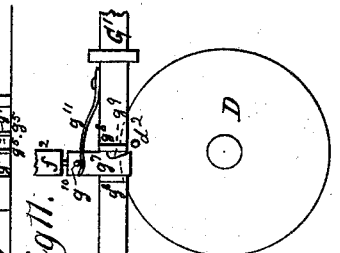
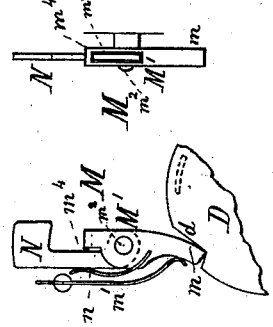
Witnesses:
J. P. Theodore Lang
J. F. Munson
Inventors:
Howard H. Barker
Gabriel Edmonston
by Mason Fenwick & Lawrence
Attorneys.

(Model.) 3 Sheets—Sheet 3.
H. H. BARKER & G. EDMONSTON.
Cut Out for Telephone Alarms.
No. 232,665. Patented Sept. 28, 1880.
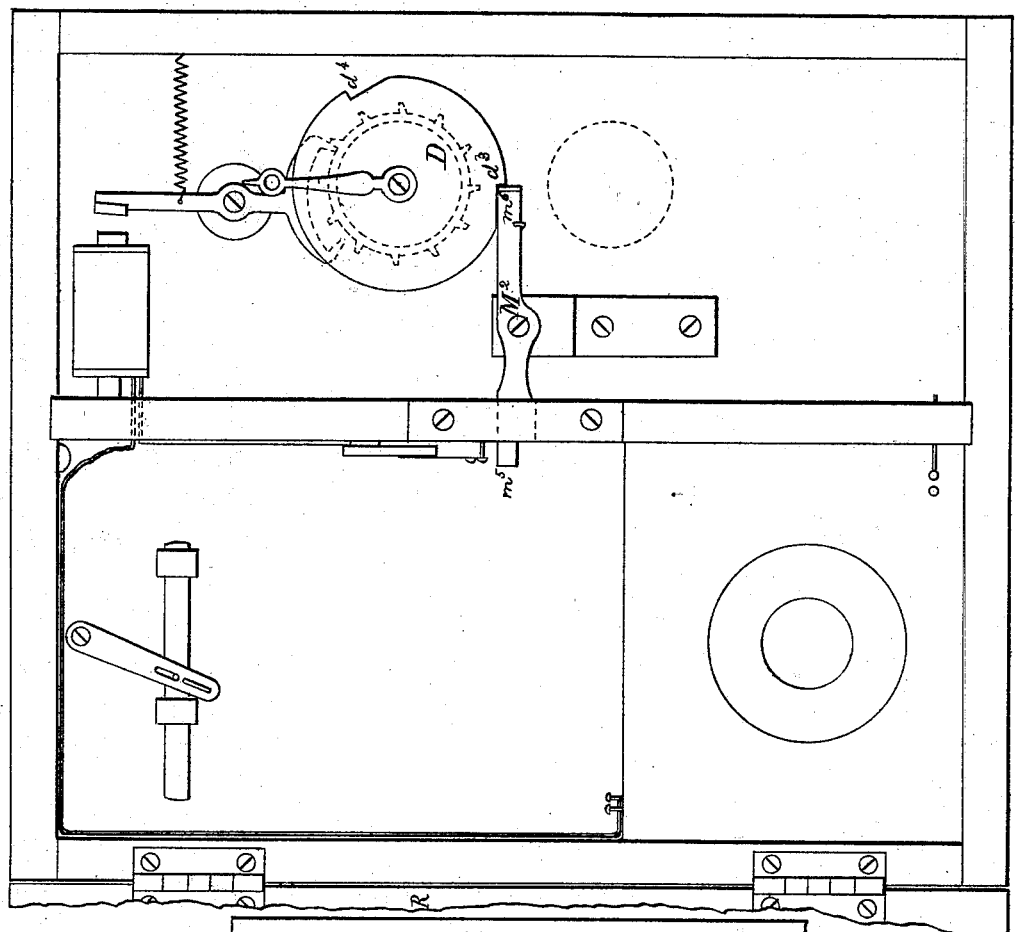
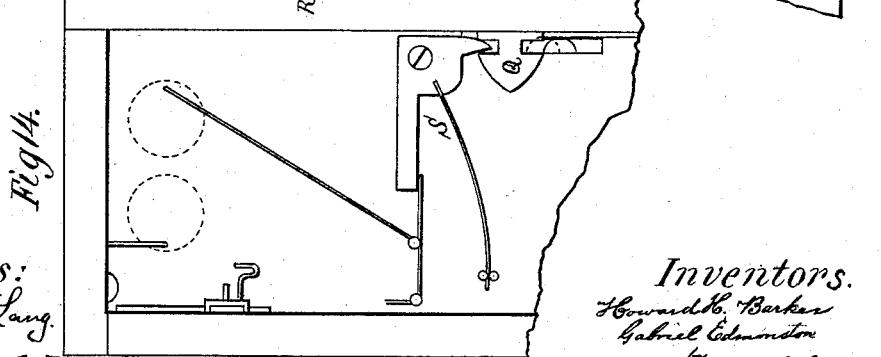
Fig 13.
Fig 14.
Witnesses:
J. P. Theodor Lang.
J. F. Munson
Inventors.
Howard H. Barker
Gabriel Edmonston
by
Mason Fenwick & Lawrence
Attorneys

UNITED STATES PATENT OFFICE.

HOWARD H. BARKER AND GABRIEL EDMONSTON, OF WASHINGTON, D. C.

CUT-OUT FOR TELEPHONE-ALARMS.

SPECIFICATION forming part of Letters Patent No. 232,665, dated September 28, 1880.

Application filed March 17, 1880. (Model.)

*To all whom it may concern:*

Be it known that we, HOWARD H. BARKER and GABRIEL EDMONSTON, citizens of the United States, and residing in the city of Washington, in the District of Columbia, have invented a new and useful Device for Cut-Outs in Telephone-Alarms, of which the following is a specification.

Our invention relates to cut-outs for alarms of telephones, and is especially applicable to the telephone-alarm patented by us in Letters Patent of the United States bearing date March 9, 1880.

The objects of our invention are, first, to prevent any other apparatus from being operated while a given one is being used to communicate with the central office; second, to prevent the use of any other apparatus while communication is going on between any two given apparatuses; and, third, to enable the manager of the central office to stop the communication between the apparatuses, and thus control their use by the respective owners. We attain these objects by the mechanism illustrated in the accompanying drawings, in which—

Figure 1 is an elevation of our improved apparatus in its normal position, the cover of its inclosing-box being removed. Fig. 2 is a similar elevation, showing the apparatus as in operation. Fig. 3 is a side elevation of the apparatus, the side wall of the inclosing-box being removed and the parts in the position shown in Fig. 1. Fig. 4 is a detail view of the checking device of the starting-button, and Fig. 5 is an edge view of the same. Fig. 6 is a detail section of the starting-button and part of the checking device. Fig. 7 is a detail view of the disk and slide whereby the telephone-switches are locked or released, the said parts being in their normal position; and Fig. 8 is a similar view, showing the slide drawn back and the disk in the act of releasing the slide. Figs. 9 and 10 are side views of the parts shown in Figs. 7 and 8, and in analogous positions. Fig. 11 is a detail view of a modification of the starting device, the parts being in their normal position, and Fig. 12 is a similar view of the same while in operation. Fig. 13 is a modification of the checking device, and Fig. 14 is a detail side view of the same.

Similar letters refer to similar parts throughout the several figures.

With our aforesaid patented invention there is a liability of inconvenience and annoyance being caused by other parties while telephone communication is being had between two given persons; and in order to render it absolutely impossible for any one to interfere with a given apparatus while it is in use, and to insure privacy, we have designed the apparatus herein described and shown for use in connection with our aforesaid patented invention or with any other similar apparatus to which it is applicable.

With our aforesaid patented apparatus we designed to accomplish the following results, to wit: First, by means of the indicator passing in front of the dial-plate every person whose telephone is in the same circuit can see at a glance whether some one else is using the wire, and thus he is informed whether or not he can use his instrument, or what telephone has been called; second, by means of the regulating apparatus the ringing of the alarm is limited to the apparatus called.

The principle upon which our present invention operates is as follows: When the pointer of the dial of the alarm-regulating mechanism stands opposite zero the button in each of the signal-switch apparatuses is in such a position that a signal may be sent to the central office by either of the apparatuses, the lower or telephone switch, by which the line is connected with the telephone, being locked in all the apparatuses, the locking of the telephone-switch being effected either by means of movable insulating-stops or by other equivalent means, such as a bolt which drops into a suitable opening upon the switch, or a switch which, when displaced, will not come in contact with the wires.

In the drawings, A represents a suitable box, which incloses an alarm-regulating mechanism, B, and an alarm mechanism, C, of the same construction as described in our said patent of March 9, 1880. With these mechanisms we connect our cut-out, which consists of a starting device, F, a releasing and locking device, G, for the connecting-switches of the telephone, and a locking device, M, whereby the starting device may be either released or locked.

The starting device F consists of a spring-button, F', suitably provided on the side of the box A, and having a pin, *f*, within range of a spring-switch, $f'$, and a shank, $f^2$, within range of the releasing device G and locking device M, as will be seen.

The end of the shank $f^2$ stands opposite a cam-plate, $g$, of a slide, $G'$, of the releasing device G. This slide $G'$ is suitably hung in upright bearings $g'$ on a partition-plate, $a$.

By means of a slot, $g^2$, in its lower end the slide $G'$ is adapted to operate a pin, $h$, on a cam-lever, H. This cam-lever H has a fixed fulcrum at $h'$, and two cam-surfaces, $h^2$, which latter are the means of operating the two levers I. The angular ends $i$ of said levers are connected by a tension-spring, $I'$, which keeps them in contact with the cam-surfaces $h^2$.

The levers I are provided with connecting-rods $i'$ $i^2$, to which non-conducting check-slides $i^3$ $i^4$ are attached. These check-slides $i^3$ $i^4$ are made to move to and from the connecting-points of two switches, L L', and thus serve to either prevent or allow the hand-lever $L^2$, which extends outside the box A within easy reach of the operator, to move the switches L L' in proper electric connection.

The rear side of the slide $G'$ is provided with a ratchet-tooth, $g^3$, which slides over a check-spring, $g^4$, when the slide $G'$ is moved up by means of the spring-button $F'$, and by means of which the spring $g^4$ holds the slide back. This spring may be laterally steadied between two pins, $g^5$.

The disk D on its rear surface is provided with a ratchet-tooth, $d'$, which, during the revolution of the disk, passes over the spring $g^4$ and depresses it sufficiently to release the tooth $g^3$ and allow the slide $G'$ to be moved back to its normal position. An arm, $g^6$, is so fastened to the slide $G'$ that the pin $e$ is enabled to strike it during the revolution of the disk E, and thus push the slide $G'$ up to the full extent of its stroke, so that it becomes locked by the spring $g^4$.

All the parts which are moved by the slide $G'$, including the switches L L' and lever $L^2$, constitute the releasing apparatus G, and their function is to make the telephone-switches operative at the proper time.

During the normal position of the disk D its notch $d$ is occupied by the arm $m$ of a spring-lever, M', of the checking or locking device M, having a tension-spring, $m'$, and fixed fulcrum $m^2$ in a suitable slot, $m^3$, of said lever M', and another lever, N, is inserted and pivoted to the same fulcrum. A tension-spring, $n$, fastened to the lever M, bears upon the back of the lever N and causes it to bear against the solid end $m^4$ of the slotted part of the lever M'.

Opposite the angular locking end of the lever N the shank $f^2$ of the spring-button $F'$ is provided with a step, $f^3$, Fig. 6, and when the disk D commences to revolve the arm $m$ of the lever M' is moved out of the slot $d$ upon the periphery of the disk D, thereby swinging the lever N behind the shank $f^2$ of the spring-button $F'$ and opposite the step $f^3$, thus locking the spring-button. If the spring-button F' does not occupy its normal position when the arm $m$ is pushed out of the notch $d$, the lever N will bear against the button-shank $f^2$, as seen in Fig. 2, until the spring-button is released, and then the spring-button will be locked, as before described.

The above-described parts constitute the locking device M, and its function is to lock all the starting devices when the regulating mechanisms are started.

The main conducting-wire O enters the apparatus at $o$; is interrupted by the switch $f'$; from there it runs to switch L, thence to the magnet of the escape, thence to the switch L', and thence out of the box again.

A wire, P, (which is a conducting-wire,) is so placed near the checks $i^3$ $i^4$ as to form connection with the switches L L' when operated by the lever $L^2$, and it thence continues to $p$—the point of connection with the telephone, which may be suitably fastened to the box A, or may be inclosed in the same. At $p'$ the wire P returns from the telephone, and thence leads to the ground or a gas-pipe or other suitable conductor.

When the apparatus is to be used the operator pushes the spring-button F' in, whereby the spring-switch $f'$ is disconnected and the slide G' moved up until it is locked by the spring $g^4$. The disconnection of the switch $f'$ causes the escape-wheel, as in our aforesaid patent, to move forward half a number. The spring-button is now allowed to move out to its former position, whereby the switch $f'$ is connected again and the escape-wheel is caused to move another half-number forward. By this operation the communication between the central office and the operator is established, and the operator, by means of the lever $L^2$, can connect his telephone with the main wire and inform the central office with whom he wishes to communicate.

In Fig. 2 the disk D stands in the position which the above-described operation has caused it to assume after the escape-wheel has moved one number forward, and in this position the notch $d$ has moved away from the arm $m$, which latter now bears upon the concentric surface of the disk, causing the lever N to bear against the button-shank $f^2$. As soon as the spring-button F' is allowed to resume its normal position, the lever N falls behind the step $f^3$ and locks the spring-button.

As all the regulating mechanisms of the respective apparatuses on the circuit work simultaneously, all the locking mechanisms thereof, in consequence, lock all the spring-buttons at the same time, and this prevents every person from using his instrument excepting the one who communicates with the central office. After due information the central office establishes communication, in the manner described in our aforesaid patent, between the caller and the called. The called receives notice through the alarm of his machine, which alarm movement also pushes the slide G' up, and thus enables the called to use the switch L or L' and talk to the caller. After the lapse of the ordinary allowance of time the central office causes the disks D and regulating mechanism of all the telephones to resume their normal position, whereby the above-mentioned communication between caller and called is stopped, and the apparatuses are all ready to be again operated.

In Figs. 11 and 12 a modification of the releasing mechanism is shown. In this modification the cam-plate $g$ is substituted by a plate, $g^7$, moving between dovetailed guides $g^8$, and having a hooked notch, $g^9$. This plate $g^7$ is provided with a pin, $g^{10}$, against which a spring, $g^{11}$, bears and holds it in the right position.

The shank $f^2$ of the spring-button F' is pressed against the plate $g^7$, which is thus moved forward and placed within range of a pin, $d^2$, on the disk D. With the movement of the spring-button the disk D is moved by the escapement, and the pin $d^2$ engages with the notch $g^9$ of the plate $g^7$ and prevents the plate from resuming its normal position until the slide G' is pushed up to the full extent of its stroke, as shown in Fig. 2.

In the modification shown in Figs. 13 and 14 the disk D is provided with two notches, $d^3$ $d^4$. A spring-lever, $M^2$, bears against the disk D with one arm, $m^6$, while its other arm, $m^5$, engages with a double hook, Q, on a lid or door, R, hinged to the box A.

When the disk is turned and the arm $m^6$ bears upon the concentric surface of the disk the arm $m^5$ locks the hook Q, and the lid R cannot be opened; but when the arm $m^6$ enters one of the notches the arm $m^5$ is placed out of the range of the hook Q and allows the opening of the box which contains the telephone-switches. In this case the hook Q is also adapted for operating a switch, S, which, in opening the lid, breaks the current, and in case of coincidence with notch $d^3$ enables the caller to communicate with the central office, or in case of coincidence with notch $d^4$ enables the called to communicate with the caller.

To further illustrate the working of the invention as applied to a series of apparatuses, we will suppose there are five apparatuses upon the same circuit, numbered, respectively, 3, 5, 7, 9, and 11, and indicators in all of them pointing to zero. The owner of No. 11, desiring to use his apparatus, presses in the button or plug F' of switch $f'$ and withdraws his finger. This act breaks the current of electricity and causes the indicator upon all the apparatuses to stand opposite the point next to zero, which may be numbered 1 or marked "called," thus showing to all persons on the line that some one has called the central office. The act of pressing in the button or plug also raises the lever H and unlocks the telephone-switches L L' in his apparatus only, all the others corresponding thereto remaining locked. As soon as the pointer passes from zero the wheel D, which revolves with it, causes the stop M to fall and engage behind the button or plug F', thus preventing its being used again. As all the wheels D on the circuit travel the same distance simultaneously, it follows that the buttons or plugs F' will be simultaneously locked in every apparatus—that is, in the one calling as well as in all the others. The mere act of pushing in the switch $f'$ causes the movement of the wheel D, (by breaking the current of electricity,) and as soon as the pressure is removed from the button or plug F' of switch $f'$ its spring restores it to its normal position and allows its stop to drop behind it, the same as previously occurred with the others in moving from their zero position. At this stage all the switches are locked except the telephone-switch of the apparatus calling. The central office having now been signaled, the operator takes off the battery, and thereby again breaks the current and causes the pointer to pass to the second point on the dial, which may be marked "switch," and will thus be the sign by which the person using the apparatus will know that the line is in readiness for him to use his telephone, and will also indicate to all other persons that the telephone is being used. The apparatus remains in this condition during the time the conversation is being carried on; nor is it possible for any one on the circuit to interfere, since, all the other switches being locked, none of them can be used except the telephone-switch of the one who has called. At the conclusion of the conversation the usual signal ("O K") is given the central office, whereupon the operator proceeds to carry the pointer again to zero in the manner described in our aforesaid patent. As the indicator passes around to zero (carrying the wheel with it) a suitable projection, $d'$, upon the wheel D displaces the spring $g^4$, upon which the slide G' has been resting, and allows it to descend to its normal position. In the drawings this is shown as occurring just before the pointer reaches zero; but if it were desirable to have it occur earlier it could be done by merely placing the projection $d'$ at a different point upon the wheel. As soon as the slide G' descends the telephone-switches in this apparatus are also locked. When the pointer reaches zero the stops M, which up to this point have remained behind the buttons or plugs F' of switches $f'$ are withdrawn, and, all of the buttons being now unlocked, any apparatus on the circuit may signal the central office, as before.

If it be considered desirable to compel a person to wait after signaling the central office until after the battery has been removed before he can switch onto his telephone, then the following modification may be made: Instead of the button F' directly raising the slide G' of lever H, it may merely cause slide $g^7$, Fig. 11, or similar device, to move to such a position that it will be engaged by a projection, $d^2$, upon the wheel which moves with the pointer, and thus the lever may be raised only at the second movement of the wheel, which is produced by taking off the battery.

To enable the operator called to operate his telephone-switches and open communication between his telephone and the one calling, the following mode is pursued: Suppose there are, as before, five apparatuses on the circuit, and the central office desires to call any one of them, the operator opens and closes the circuit, as before described. The first time the circuit is broken all the switches $f'$ are locked by the turning of the wheel D, as before described; but as the lever has not been raised in any of the apparatuses it follows that all the telephone-switches are now locked. As soon, however, as the pointer stops at the number of the apparatus called, the alarm is sounded, as described in our aforesaid patent, and the pin of the wheel E on the arbor $c$ of the alarm proper during the sounding of the alarm raises the slide G' to its highest position, where it is supported upon the spring $g^4$. Thus, again, the telephone-switches have been unlocked in one apparatus only—to wit, the one called. After the communication is finished the parts are returned to their zero position by the operator at the central office.

We claim—

1. In a telephone-alarm regulating and sounding apparatus, the combination of a starting device, F, a switch-releasing device, G, and a locking device, M, substantially as and for the purpose set forth.

2. The combination of the disk D, having a notch, $d$, the locking device M, spring-button F', having pin $f$, and switch $f'$, substantially as described.

3. The combination of the disk E, having pin $e$, and the switch-releasing device, having the arm $g^6$, substantially as and for the purpose set forth.

4. The combination of the checks $i^3$ $i^4$, switches L L', lever $L^2$, and a releasing and locking device, G, substantially as and for the purpose described.

5. The starting device F, adapted for operating the signal or escapement switch and the releasing mechanism of the telephone-switches, substantially as and for the purpose described.

6. The rotary disk D or wheel on the arbor of the escapement-wheel, adapted for operating the locking mechanism of the starting device of the signal or escapement switch, substantially as described.

7. The rotary disk or wheel D on the arbor of the escapement-wheel, and provided with a projection, $d'$, for operating the detent $g^4$ of the slide G', substantially as and for the purpose described.

HOWARD H. BARKER.
GABRIEL EDMONSTON.

Witnesses:
J. P. THEODORE LANG,
H. A. HALL.